F. A. M. SCHIECHEL.
APPARATUS FOR SEPARATING MINERALS AND LIKE MATERIALS.
APPLICATION FILED AUG. 22, 1910.
1,151,722.
Patented Aug. 31, 1915.
2 SHEETS—SHEET 1.
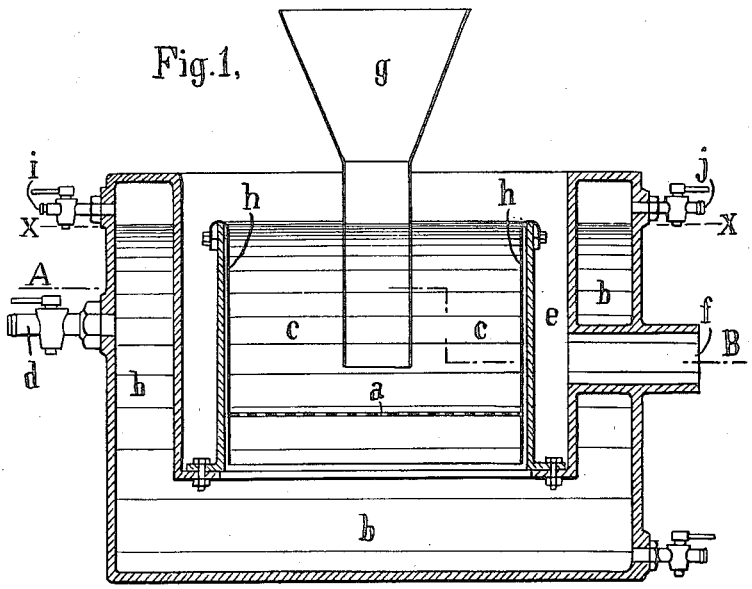
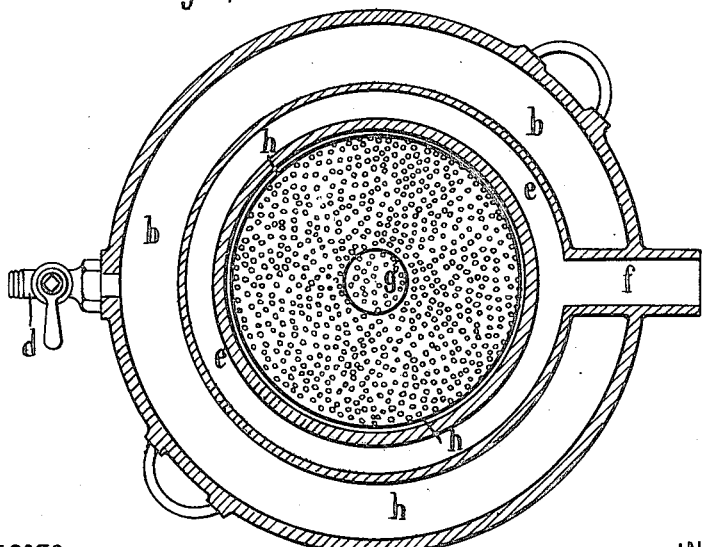
WITNESSES:
INVENTOR
BY
ATTORNEYS

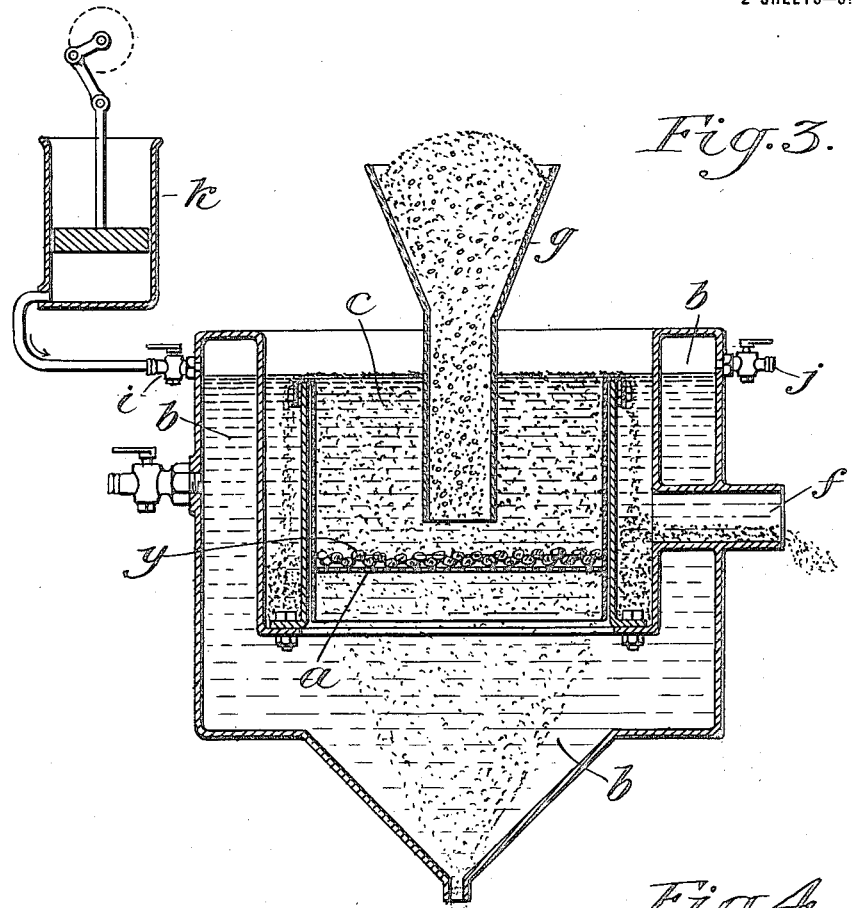
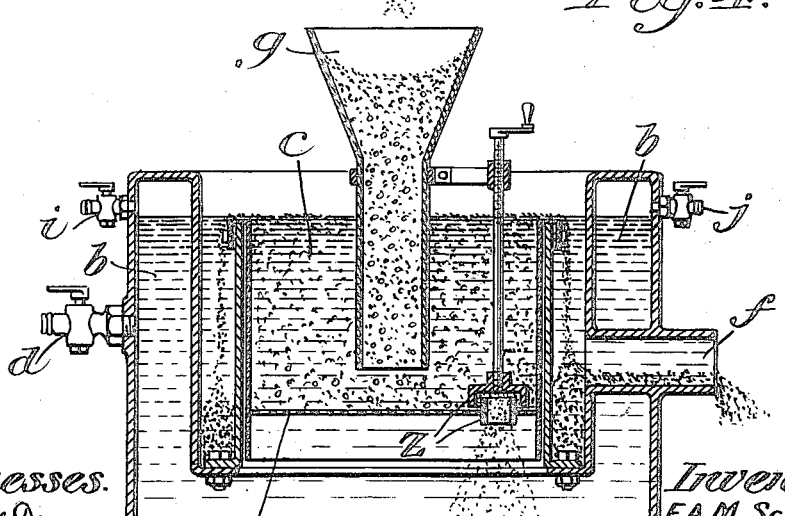

UNITED STATES PATENT OFFICE.

FRIEDRICH ARTHUR MAXIMILIAN SCHIECHEL, OF FRANKFORT-ON-THE-MAIN, GERMANY.

APPARATUS FOR SEPARATING MINERALS AND LIKE MATERIALS.

1,151,722.     Specification of Letters Patent.     Patented Aug. 31, 1915.

Application filed August 22, 1910. Serial No. 578,440.

*To all whom it may concern:*

Be it known that I, FRIEDRICH ARTHUR MAXIMILIAN SCHIECHEL, engineer, a subject of the Emperor of Austria-Hungary, residing at Wolfgangstrasse 92, Frankfort-on-the-Main, Germany, have invented certain new and useful Improvements in Apparatus for Separating Minerals and like Materials, of which the following is a specification.

My invention relates to apparatus for separating minerals and like materials in which a rising current of water is caused to pass through the mass of minerals to be separated, while the mass is frequently shaken. Although the invention is specially applicable in dressing diamonds, gold and the like, it may however as well be used for dressing other minerals, ores and the like.

In the accompanying drawings, I have illustrated one form of apparatus for carrying out the method herein disclosed, in which—

Figure 1 is a vertical section; Fig. 2 is a horizontal section on line A—B of Fig. 1; and Figs. 3 and 4 show particularly the air compressor, the foraminous bed and the continuous discharge means, as will hereinafter appear.

$a$ is a screen bed upon which a layer of the mass to be separated is fed.

$b$ is a compartment communicating with the separating compartment $c$ above the screen bed $a$. A continuous water stream is directed through a pipe $d$ into the compartment $b$. In flowing over the upper edge of the partition wall of the separating compartment $c$ the water and tailings fall into a discharge compartment $e$ whence they are drawn off through pipe $f$. The material to be separated is fed to the compartment $c$ through the hopper $g$. The discharge mouth of the hopper $g$ extends nearly to the screen bed $a$ so as to allow the fresh material to be fed as much as possible underneath the surface of the material to be separated. By means of this arrangement the particles of higher specific gravity which are intended to be moved toward the screen bed as a result of the separating process need not travel from above through the whole mass of material in order to settle at the bottom, the separation thus being accelerated.

If precious stones (for instance diamonds) or precious metals are to be dressed, which yield but a small amount of concentrates, it is advisable to arrange the separating compartment $c$ as shown in the drawings. It will be seen that in this case the compartment $c$ consists of a case $h$ which supports the screen bed $a$ and which by means of its hook-shaped upper end and screws or the like, is removably fastened to the partition wall separating the compartment $c$ from the discharge compartment $e$. The material to be separated is fed through the hopper $g$, and the water and tailings continuously flow over the edge of the compartment $c$. The feeding of fresh material may be continued until a sufficient amount of precious stones or precious metals has settled upon the screen bed $a$. The operation is then interrupted to permit the removal of the case $h$ to discharge its contents. The discharge of the concentrates might of course be effected as well continuously and automatically in the well-known manner, such as by means of the valve $z$.

Instead of the screen bed $a$, a screen bed might be made use of provided with a foraminous layer of material of high specific gravity (such as small shots of baryta, pyrites, iron and the like), as is shown at $y$ in Fig. 3.

While being traversed by the continuous water current the ore mass is stirred up by being shaken frequently. Preferably such shaking of the ore may be effected by exposing the continuous current of water to the action of pulsating shocks at short intervals of time. Such shocks are transmitted to the ore mass to be separated, thus imparting to the latter the desired shaking motion. The shocks may be advantageously produced by frequently compressing and expanding an air mass acting upon the continuous water current. For this purpose a closed air chamber (as shown in the drawing) is formed above the surface of the water in the compartment $b$ and this chamber is connected by means of a pipe or hose $i$ to the chamber $k$ of an air compressor, this chamber being closed to the outer air so that at each to-and-fro-stroke of the piston of the compressor the air in the air chamber of the compartment $b$ is alternately compressed and expanded. The surface of the water in said compartment $b$ is thus acted upon by pulsating shocks succeeding each other at very short intervals, which are transmitted by the water to the compartment $c$. The particles of the ore mass contained in the compartment $e$ are thus constantly kept in motion and stirred up with the result that the flow of water is distributed uniformly over the whole section of the separating compartment, so as to prevent the formation of whirlpools which are liable to impede and retard the separation. The rapid succession of the compression and expansion of the air in the compartment $b$ may of course be effected by means other than an air compressor.

The separating process with the apparatus described will be as follows: After the compartment $c$ has been filled with the material to be separated, water under pressure is admitted continuously through pipe $d$ to the compartment $b$. The water will rise in the compartment $c$ and overflow into the compartment $e$. In the compartment $b$ the water will rise up to line $x$—$x$. While the water is rising the cock $j$ is to be kept open to allow the air to escape. Afterward the cock $j$ has to to be closed and the free space above the water line $x$—$x$ is connected with the air compressor $k$ by means of pipe $i$. Water under pressure then continuously enters through pipe $d$ whereas the waste water is discharged through compartment $e$ and discharge pipe $f$ together with the tailings. Fresh material is fed through the hopper $g$. By the effect of the continuously rising water current and the vibrating motion of the ore mass produced by the pulsating shocks imparted to the water, the particles of the ore mass are kept in a somewhat floating condition in the water and thus the mass is constantly in such a loose condition that the contents of compartment $c$ may be considered as a liquid mass of high specific gravity, in which the particles of less specific gravity rise to the top. The heavier particles sinking down are gathered upon the screen bed and are discharged by hand in the manner described above, whenever a sufficient quantity has collected there, or they may be removed in a continuous and automatic manner by means of any suitable arrangement. The rising particles of low specific gravity pass out with the water into the compartment $e$ and are discharged through pipe $f$.

In the drawings there is shown an apparatus of circular section, in which the separating compartment $e$, the communicating compartment $b$ and the discharge compartment $e$ are concentric with each other. Of course the invention is not to be limited to this concentrical form of construction, which owing to its easy manipulation is especially suitable for discontinuous work (such as for instance diamond dressing). Any other sectional form may be made use of and the special arrangement of the parts may be modified according to the requirements of the special use.

Having thus fully described the nature of my invention, I claim as new and desire to secure by Letters Patent:

1. In apparatus for separating minerals and like materials, a separating compartment having a bottom formed by a perforated or foraminous bed, a surrounding annular compartment communicating with said separating compartment, from underneath the perforated or foraminous bed, a water supply pipe furnishing said communicating compartment with an uninterrupted water stream continuously rising in the separating compartment, a closed air chamber above the water line of the communicating compartment, means for applying intermittent air pressure within said air chamber, a discharge compartment into which discharge the water and tailings overflowing the upper edge of the separating compartment, and means for feeding material to the separating compartment.

2. In apparatus for separating minerals and like materials, a separating compartment having a bottom formed by a perforated or foraminous bed, a compartment surrounding and communicating with said separating compartment from underneath the perforated or foraminous bed, a water supply pipe furnishing said communicating compartment with an uninterrupted water stream continuously rising in the separating compartment, a closed air chamber above the water line of the communicating compartment, means for applying intermittent air pressure within said air chamber, and a discharge compartment intermediate the separating and communicating compartments and into which discharge the water and tailings overflowing the upper edge of the separating compartment, the separating compartment, the communicating compartment and the discharge compartment being concentrically arranged.

3. An apparatus for separating minerals and like materials comprising a separating compartment open to the atmosphere having a perforated bed, means for feeding material substantially coaxial therewith, a surrounding annular chamber closed at its top and communicating with said separating compartment through said perforated bed, means for continuously supplying water thereto and means for applying intermittent air pressure within said surrounding chamber.

4. An apparatus for separating minerals and like materials comprising a separating compartment having a perforated or foraminated bed, a water chamber having an air space above the water line, said chamber surrounding the separating compartment and communicating therewith through said bed, means for applying intermittent air pressure within the air space of the water chamber, the separating chamber being adapted to overflow the water and lighter material at the periphery thereof, and means for feeding material to the separating compartments.

5. An apparatus for separating minerals and like materials comprising a separating compartment having a perforated or foraminated bed, a water chamber of annular form surrounding the separating compartment and communicating therewith and having an air space above the water line, means for applying air pressure within the air space of the water chamber, the separating chamber being adapted to overflow the water and lighter material at the periphery thereof, and means for feeding material to the separating compartment centrally thereof and in proximity to the foraminous bed.

6. An apparatus for separating minerals and like materials comprising a separating compartment having a perforated or foraminated bed, a water chamber of annular form surrounding the separating compartment and communicating therewith, a tailings receptacle intermediate the separating compartment and water chamber, means for delivering a pulsating supply of water to the water chamber, the separating chamber being adapted to overflow the water and lighter material at the periphery thereof, and means for feeding material to the separating compartment centrally thereof and in proximity to the foraminous bed.

In testimony whereof, I affix my signature in presence of two witnesses.

FRIEDRICH ARTHUR
   MAXIMILIAN SCHIECHEL.

Witnesses:
 JEAN GRUND,
 CARL GRUND.